(12) United States Patent
Hussain et al.

(10) Patent No.: US 12,327,557 B2
(45) Date of Patent: Jun. 10, 2025

(54) INDEXING APPLICATION ACTIONS FOR VOICE-BASED EXECUTION

(71) Applicant: Google LLC, Mountain View, CA (US)

(72) Inventors: Quazi Hussain, Mountain View, CA (US); Mubaraq Mishra, Belmont, CA (US); Vidhya Bhat, Mountain View, CA (US); Adam Cohen, Mountain View, CA (US); Sunny Goyal, San Mateo, CA (US); Adam Coimbra, Mountain View, CA (US); Sanjana Patel, Fremont, CA (US); Ilya Firman, Sunnyvale, CA (US); Mehdi Alizadeh, South San Francisco, CA (US); Saurabh Kumar, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 234 days.

(21) Appl. No.: 18/004,971

(22) PCT Filed: May 18, 2021

(86) PCT No.: PCT/US2021/032939
§ 371 (c)(1),
(2) Date: Jan. 10, 2023

(87) PCT Pub. No.: WO2022/245339
PCT Pub. Date: Nov. 24, 2022

(65) Prior Publication Data
US 2023/0267928 A1    Aug. 24, 2023

(51) Int. Cl.
*G10L 15/22* (2006.01)
*G06F 16/901* (2019.01)
(Continued)

(52) U.S. Cl.
CPC .......... *G10L 15/22* (2013.01); *G06F 16/901* (2019.01); *G06F 21/602* (2013.01);
(Continued)

(58) Field of Classification Search
CPC ... G10L 15/22; G10L 15/1822; G06F 16/901; G06F 21/602; H04L 9/3213
(Continued)

(56) References Cited

U.S. PATENT DOCUMENTS 10,187,373 B1 *  1/2019  Poole .................... H04L 9/3213
11,606,412 B2 *  3/2023  Jiang .................... G06F 16/9558
(Continued)

FOREIGN PATENT DOCUMENTS

WO    WO 2020/106314    5/2020

OTHER PUBLICATIONS

International Search Report for Application No. PCT/US2021/032939, mailed on Feb. 24, 2022, 3 pages.
(Continued)

*Primary Examiner* — Dant B Shaifer Harriman
(74) *Attorney, Agent, or Firm* — DORITY & MANNING P.A.

(57) ABSTRACT

Indexing application actions for voice-based execution is provided. An indexer of a device receives, from an application executed by the device, an indication of an action and a deep link corresponding to the action declared by the application via an application programming interface. The indexer accesses an index stored in the memory of the device that is accessible to a plurality of applications. The indexer inputs, into a location in the index, the action and the deep link with a cryptographic token that prevents access to the deep link by unauthorized applications. A digital assistant of the device receives a voice query detected by a microphone and parses the voice query to determine the action. The
(Continued)

digital assistant identifies in the index the deep link corresponding to the action. The digital assistant invokes, with the cryptographic token, the deep link to cause the application to perform the action.

18 Claims, 5 Drawing Sheets

(51) Int. Cl.
    *G06F 21/60*     (2013.01)
    *G10L 15/18*     (2013.01)
    *H04L 9/32*     (2006.01)

(52) U.S. Cl.
    CPC ........ *G10L 15/1822* (2013.01); *H04L 9/3213* (2013.01); *G10L 2015/223* (2013.01)

(58) Field of Classification Search
    USPC ........................................................ 713/193
    See application file for complete search history.

(56) References Cited

U.S. PATENT DOCUMENTS

| | | | |
|---|---|---|---|
| 2013/0110815 A1* | 5/2013 | Tankovich | G06F 16/9535 |
| | | | 707/711 |
| 2016/0203002 A1* | 7/2016 | Kannan | G06F 3/162 |
| | | | 715/708 |
| 2017/0116339 A1* | 4/2017 | Stein | G06F 16/24578 |
| 2018/0247654 A1 | 8/2018 | Bhaya et al. | |
| 2018/0336010 A1 | 11/2018 | Mukherjee | |
| 2020/0067701 A1* | 2/2020 | Abadir | G06K 7/1417 |
| 2020/0334675 A1* | 10/2020 | Heyner | H04L 9/3247 |
| 2023/0188358 A1* | 6/2023 | Wang | H04L 9/3247 |
| | | | 713/176 |

OTHER PUBLICATIONS

International Preliminary Report on Patentability for Application No. PCT/US2021/032939, mailed Nov. 30, 2023, 8 pages.

* cited by examiner

INDEXING APPLICATION ACTIONS FOR VOICE-BASED EXECUTION

PRIORITY CLAIM

This application is based upon and claims the right of priority under 35 U.S.C. § 371 to International Application No. PCT/US2021/032939 filed on May 18, 2021, which is incorporated by reference herein.

BACKGROUND

A computing device can execute applications to perform tasks. As new applications are installed on the computing device, or an application performs an increasing number of tasks, it can be challenging to efficiently identify and execute a task in an application.

SUMMARY

This disclosure is generally directed to indexing application actions for voice-based execution. Applications installed on devices can have various capabilities. For example, applications can order food or beverage items, perform e-commerce, access information provided by data sources, order rides, make calls, or provide exercise routines. However, a digital assistant may not be aware of these capabilities for various reasons, or be capable of reliably selecting an action to perform responsive to a voice query. For example, due to the latency or unreliability associated with selecting an action associated with a capability of an application, the application may declare to the digital assistant a limited number of capabilities, such as only 5 to 15 capabilities, to facilitate the digital assistant from selecting a capability responsive to the voice-based query, thereby limiting the types of voice queries for which the digital assistant can respond, or requiring additional interactions to perform an action associated with a different capability of the application.

Thus, systems and methods of this technical solution can provide an application programming interface that allows applications to declare actions and corresponding deep links for storage in an index on the device. The index may be stored on a local device to reduce latency introduced by network communications or executing remote procedure calls. Further, the index can store the action with the deep link in a secure manner that prevents unauthorized applications from invoking the deep link. The application can declare actions and deep link when the application is installed on the device, or when the application is used by the user to perform an action. A digital assistant executing on the device can receive a voice query, identify an action in the voice query, and perform a lookup in the index to identify one or more applications that have deep links corresponding to the action. The digital assistant can rank the applications based on usage (e.g., how many times the application has been executed on the device, or executed to perform the action) or recency (e.g., the last time the application was executed on the device, or executed to perform the action). The digital assistant can then invoke the deep link associated with the highest ranking application.

At least one aspect is directed to a system to dynamically index application actions for voice-based execution. The system can include a device having one or more processors and memory. The device can include or execute an indexer and a digital assistant. The device can include, execute, or have installed therein one or more applications. The indexer can receive, from an application executed by the device, an indication of an action and a deep link corresponding to the action. The indication of the action and the corresponding deep link can be declared by the application via an application programming interface. The indexer can access an index stored in the memory of the device that is accessible to a plurality of applications executable by the device. The indexer can input, into a location in the index, the action and the deep link with a cryptographic token that enforces that only authorized applications (e.g., digital assistants) can execute the action or prevents access to the deep link in the index by unauthorized applications of the plurality of applications. The digital assistant can receive a voice query detected by a microphone of the device. The digital assistant can parse the voice query to determine the action. The digital assistant can perform a lookup in the index to identify the deep link corresponding to the action. The digital assistant can invoke, with the cryptographic token, the deep link to cause the application executed by the device to perform the action.

At least one aspect is directed to a method of dynamically indexing application actions for voice-based execution. The method can be performed by a device having one or more processors and memory. The method can include an indexer executed by the device receiving, from an application executed by the device, an indication of an action and a deep link corresponding to the action declared by the application via an application programming interface. The method can include the indexer accessing an index stored in the memory of the device that is accessible to a plurality of applications executable by the device. The method can include the indexer inputting, into a location in the index, the action and the deep link with a cryptographic token that prevents access to the deep link in the index by unauthorized applications of the plurality of applications. The method can include a digital assistant executed by the device receiving a voice query detected by a microphone of the device. The method can include the digital assistant parsing the voice query to determine the action. The method can include the digital assistant performing a lookup in the index to identify the deep link corresponding to the action. The method can include the digital assistant invoking, with the cryptographic token, the deep link to cause the application executed by the device to perform the action.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
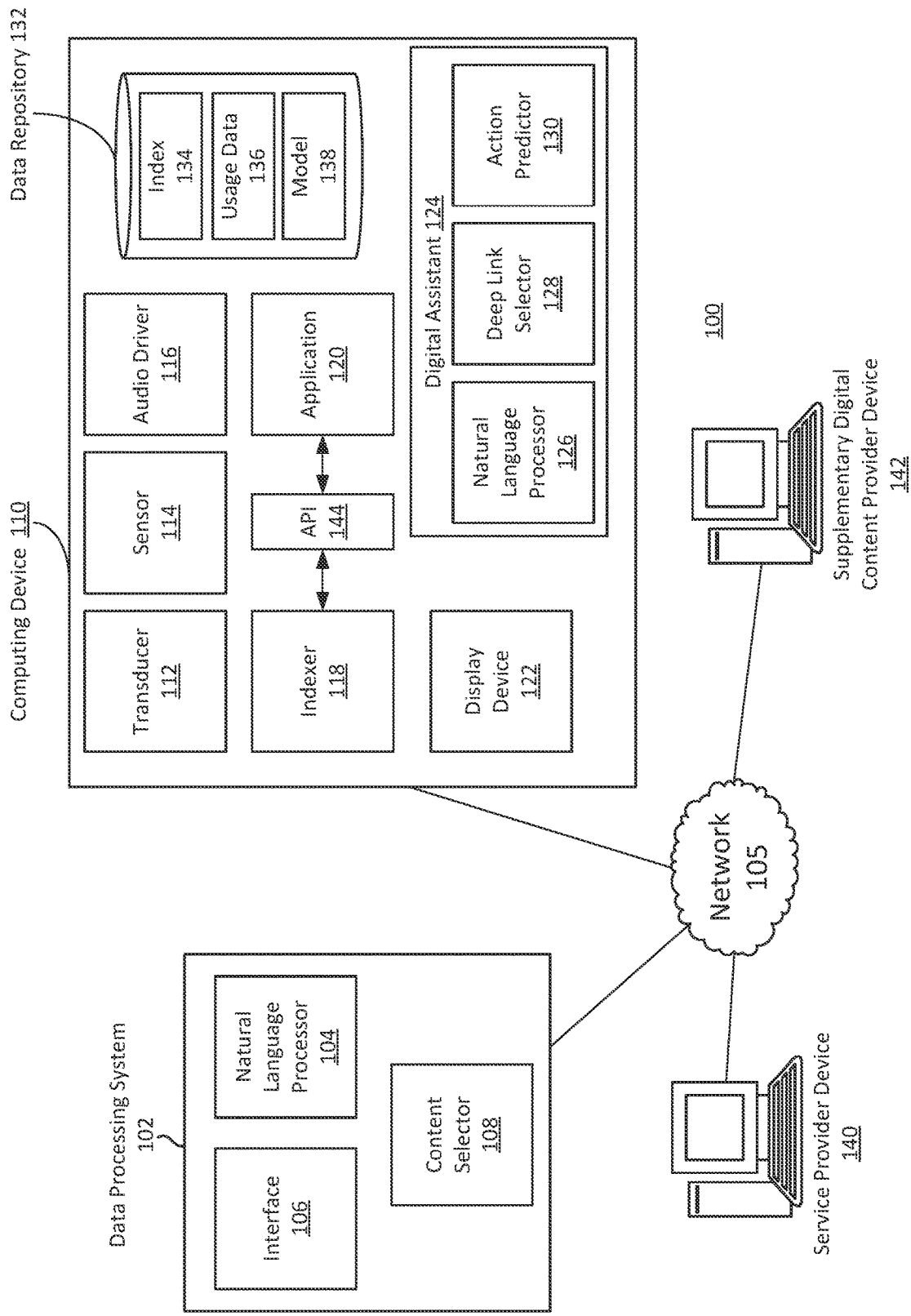
FIG. 1 is an illustration of an example system to index application actions for voice-based execution, in accordance with implementations.

Following below are more detailed descriptions of various concepts related to, and implementations of, methods, apparatuses, and systems of indexing application actions for voice-based execution. The various concepts introduced above and discussed in greater detail below may be implemented in any of numerous ways.

This technical solution is generally directed to indexing application actions for voice-based execution or execution by other digital surfaces. The technical solution can generate an index that securely stores actions and corresponding deep links declared by applications installed on or executing on a device. A digital assistant can receive a voice query, parse the voice query to identify an action, and perform a look up in the index to identify one or more deep links provided by one or more applications that can execute the action. The digital assistant can rank the applications to select the highest ranking application, and invoke the corresponding the deep link to execute the action.

For example, the device can include an application that can order a coffee from a coffee shop. The application can declare the capability to order a coffee when the application is installed on the device, or the application can dynamically declare the capability to order the coffee responsive to the application being used to order the coffee. For example, a user can launch the application to order a specific coffee from a coffee shop at a specific location. The application, responsive to this order, can declare or push the order and the parameters associated with the specific order to an indexer of the device via an application programming interface. The declaration can include an indication of the action (e.g., order a coffee) and a deep link that can execute the action. The indexer can store the action (or capability or intent) in an index and associate the deep link with the action in in the index. The index can store a large number of actions and deep link for each application, such as hundreds, thousands, tens of thousands, or more actions and deep links for each application installed on the device. For example, each row in the index can include a deep link for an intent. T The indexer can encrypt the deep link such that unauthorized application cannot access or invoke the deep link, thereby preventing undesired or malicious execution of actions by unauthorized applications, and reducing wasted computing resource utilization, computing resources, or network bandwidth utilization. The indexer can wrap the intent with a cryptographic token. A cryptographic token can represent a programmable access rights that are accessible only by the application that has the private key for that address, and can only be signed using the private key.

Once the index is generated, a digital assistant executing on the device can invoke deep links stored in the index responsive to a voice query from a user of the device. The digital assistant can use natural language processing or understanding to parse a voice query and determine an intent or action in the voice query. In some cases, the voice query can include an indication (e.g., identifier or name) of the application to use to perform the action, while in other cases the voice query may not include an indication of the application to use. The digital assistant, upon identifying the action or intent, can perform a lookup in the index to identify one or more actions in the index that correspond to or match the action. If there are multiple deep link for multiple applications for the action, the digital assistant can rank the applications to select the highest ranking application for the action. The digital assistant can use the token or key for the encrypted deep link to invoke the deep link and perform the action.

In an illustrative example, the voice query can be a user defined voice query such as "Good Morning" or "lunch time" that can cause execution of one or more actions. In another illustrative example, the voice query can be to order a coffee from a coffee shop. The digital assistant can parse the voice query to determine the intent, such as to perform tasks associated with a morning routine (e.g., check the news, weather, upcoming meetings), communicate with one or more contacts with which to go to lunch, or order a coffee. The digital assistant can perform a lookup in the index with the intent to identify one or more deep links for one or more applications that are associated with the intent. The digital assistant can rank the one or more applications to select a highest ranking application, and invoke the corresponding one or more deep links to perform the action or intent.

Thus, the digital assistant of this technical solution an use natural language understanding to determine the intent, and access an index storing intents to identify a corresponding deep link for an application to invoke to execute the intent or action. In some cases, the intent can be associated with a parameter that can be input into the deep link or application to perform the action. For example, for ordering a coffee, the parameter can include a size of the coffee. In another example, for communicating with a contact to go to lunch, the parameter can include a name of the contact. In some cases, the digital assistant can use the parameter to perform the lookup. For example, if the parameter includes the contact name, then the digital assistant can identify an action or deep link in the index that is for the contact name. The deep link can be for an application that is configured with information to communicate with the contact name.

The digital assistant can proactively invoke actions or deep links, or proactively suggest an action to perform or deep link to invoke. Proactive invocation or suggestion can refer to invoking the deep link or suggesting a deep link without receiving a voice query from the user. The digital assistant can identify a trigger condition that is separate from a voice query, and then perform a lookup in the index for an action corresponding to the trigger condition. The trigger condition can be based on geographic location, time of day, day of the week, or other interactions with the device. For example, the digital assistant can detect that it is lunch time, and suggest, based on historical data, the user invoke an action to communicate with one or more contacts to go to lunch. In another example, at a time of day the user typically orders coffee, the digital assistant can suggest to the user to invoke an action to order a cup of coffee via a deep link of an action.

Thus, this technical solution can remove limits on the number of actions, deep links or shortcuts that can be declared by applications and stored in an index on a computing device for subsequent execution. The index can be stored or represented structured or hierarchical semantics.

The index can store the shortcut to a coffee order with an association to an ORDER_MENU_ITEM capability of an application in the index XML file. A shortcut for "cappuccino" can be used to as inventory for fulfilling the ORDER_MENU_ITEM capability. The shortcuts (e.g., actions, intents, or deep links) can be dynamically declared or donated by applications for storage in the index XML file.

In addition to voice-based digital assistant scenarios, this technical solution can be used with other digital surfaces, such as type ahead search (e.g. a search engine search Suggest or an on-device search feature), or a proactive suggestions on a home screen of a device, or in a digital assistant through notifications.

FIG. 1 illustrates an example system 100 to index application actions for voice-based execution. The system 100 can include content selection infrastructure. The system 100 can include a data processing system 102. The data processing system 102 can communicate with one or more of a computing device 110, service provider device 140, or a supplementary digital content provider device 142 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be provided, output, rendered, or displayed on at least one local computing device 110, such as a laptop, desktop, tablet, digital assistant device, smart phone, mobile telecommunication device, portable computers, or speaker. For example, via the network 105 a user of the local computing device 110 can access information or data provided by a supplementary digital content provider device 142. In some cases, the computing device 110 may or may not include a display; for example, the computing device may include limited types of user interfaces, such as a microphone and speaker. In some cases, the primary user interface of the computing device 110 may be a microphone and speaker, or voice interface. In some cases, the computing device 110 includes a display device 122 coupled to the computing device 110, and the primary user interface of the computing device 110 can leverage the display device 122.

The local computing device 110 can refer to a computing device 110 that is being used by a user or in the possession of a user. The local computing device 110 can refer to a computing device or client device that is located at a private setting, such as a residence, residential dwelling, home, apartment, condominium. The computing device 110 can be located at a public setting, such as a hotel, office, restaurant, retail store, mall, or park. The computing device 110 can be located with a user as the user travels or moves from one location to another. The term local can refer to the computing device being located where a user can interact with the computing device using voice input or other input. The local computing device can be located remote from a remote server, such as a data processing system 102. Thus, the local computing device 110 can be positioned in private or public location at which a user can interact with the local computing device 110 using voice input, whereas the data processing system 102 can be located remotely in a data center, for example. The local computing device 110 can be referred to as a digital assistant device.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be provided, output, rendered, or displayed by the local client computing device 110. For example, via the network 105 a user of the local client computing device 110 can access information or data provided by the supplementary digital content provider device 142 or the service provider computing device 140.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 110, the supplementary digital content provider device 142 (or third-party content provider device, content provider device), or the service provider device 140 (or third-party service provider device). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device, such as a service provider device 140 or supplementary digital content provider device 142. The service provider device 140 can include at least one logic device such as a computing device having a processor to communicate via the network 105, for example with the computing device 110, the data processing system 102, or the supplementary digital content provider device 142. The service provider device 140 can include at least one computation resource, server, processor or memory. For example, service provider device 140 can include a plurality of computation resources or servers located in at least one data center.

The supplementary digital content provider device 142 can provide audio based digital components for display by the local computing device 110 as an audio output digital component. The digital component can be referred to as a sponsored digital component because it is provided by a third-party sponsor. The digital component can include an offer for a good or service, such as a voice based message that states: "Would you like me to order you a taxi?" For example, the supplementary digital content provider device 142 can include memory to store a series of audio digital components that can be provided in response to a voice based query. The supplementary digital content provider device 142 can also provide audio based digital components (or other digital components) to the data processing system 102 where they can be stored in a data repository of the data processing system 102. The data processing system 102 can select the audio digital components and provide (or instruct the supplementary digital content provider device 142 to provide) the audio digital components to the client computing device 110. The audio based digital components can be exclusively audio or can be combined with text, image, or video data.

The service provider device 140 can include, interface with, or otherwise communicate with the data processing system 102. The service provider device 140 can include, interface, or otherwise communicate with the local computing device 110. The service provider device 140 can include, interface, or otherwise communicate with the computing device 110, which can be a mobile computing device. The service provider device 140 can include, interface, or otherwise communicate with the supplementary digital content provider device 142. For example, the service provider device 140 can provide a digital component to the local computing device 110 for execution by the local computing device 110. The service provider device 140 can provide the digital component to the data processing system 102 for storage by the data processing system 102.

The data processing system 102 can include a content placement system having at least one computation resource or server. The data processing system 102 can include, interface, or otherwise communicate with at least one interface 106. The data processing system 102 can include, interface, or otherwise communicate with at least one natural language processor component 104. The interface 106 or natural language processor 104 can form or be referred to as a server digital assistant component. The data processing system 102 can include, interface, or otherwise communicate with at least one server digital assistant component. The server digital assistant component can communicate or interface with one or more voice-based interfaces or various digital assistant devices or surfaces in order to provide data or receive data or perform other functionality.

The data processing system 102, interface 106, NLP 104, or content selector 108 can each include at least one processing unit or other logic device such as programmable logic array engine, or module configured to communicate with a data repository or database of the data processing system 102. The interface 106, NLP 104, or content selector 108 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of local computing devices 110 (or computing device or digital assistant device). A user of a local computing device 110 or mobile computing device can affirmatively authorize the data processing system 102 to obtain network activity information corresponding to the local computing device 110 or mobile computing device. For example, the data processing system 102 can prompt the user of the computing device 110 for consent to obtain one or more types of network activity information. The local computing device 110 can include a mobile computing device, such as a smartphone, tablet, smartwatch, or wearable device. The identity of the user of the local computing device 110 can remain anonymous and the computing device 110 can be associated with a unique identifier (e.g., a unique identifier for the user or the computing device provided by the data processing system or a user of the computing device). The data processing system can associate each observation with a corresponding unique identifier.

The data processing system 102 can include an interface 106 (or interface component) designed, configured, constructed, or operational to receive and transmit information using, for example, data packets. The interface 106 can receive and transmit information using one or more protocols, such as a network protocol. The interface 106 can include a hardware interface, software interface, wired interface, or wireless interface. The interface 106 can facilitate translating or formatting data from one format to another format. For example, the interface 106 can include an application programming interface that includes definitions for communicating between various components, such as software components. The interface 106 can communicate with one or more of the local computing device 110, supplementary digital content provider device 142, or service provider device 140 via network 105.

The data processing system 102 can interface with an application, script or program installed at the local client computing device 110, such as an app to communicate input audio signals to the interface 106 of the data processing system 102 and to drive components of the local client computing device to render output audio signals. The data processing system 102 can receive data packets or other signal that includes or identifies an audio input signal.

The data processing system 102 can include a natural language processor ("NLP") 104. For example, the data processing system 102 can execute or run the NLP 104 to parse the audio signal. For example, the NLP 104 can provide for interactions between a human and a computer. The NLP 104 can be configured with techniques for understanding natural language and allowing the data processing system 102 to derive meaning from human or natural language input. The NLP 104 can include or be configured with technique based on machine learning, such as statistical machine learning. The NLP 104 can utilize decision trees, statistical models, or probabilistic models to parse the input audio signal. The NLP 104 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP 104 can convert the audio input signal into recognized text by comparing the input signal against a stored, representative set of audio waveforms and choosing the closest matches. The set of audio waveforms can be stored in a data repository or other database accessible to the data processing system 102. The representative waveforms are generated across a large set of users, and then may be augmented with speech samples from the user. After the audio signal is converted into recognized text, the NLP 104 matches the text to words that are associated, for example via training across users or through manual specification, with actions that the data processing system 102 can serve. Aspects or functionality of the NLP 104 can be performed by the data processing system 102 or the local computing device 110. For example, a local NLP component can execute on the local computing device 110 to perform aspects of converting the input audio signal to text and transmitting the text via data packets to the data processing system 102 for further natural language processing.

The audio input signal can be detected by the sensor 114 or transducer 112 (e.g., a microphone) of the local client computing device 110. Via the transducer 112, the audio driver 116, or other components the local client computing device 110 can provide the audio input signal to the data processing system 102 (e.g., via the network 105) where it can be received (e.g., by the interface 106) and provided to the NLP 104 or stored in a data repository.

The data processing system 102 can receive, via the interface, from the digital assistant 124, the data packets comprising the filtered (or unfiltered) input audio signal detected by the sensor. The data processing system 102 can process the data packets to perform an action or otherwise respond to the voice input. In some cases, the data processing system 102 can identify an acoustic signature from the input audio signal. The data processing system 102 can identify, based on a lookup in a data repository (e.g., querying a database), an electronic account corresponding to the acoustic signature. The data processing system 102 can establish, responsive to identification of the electronic account, a session and an account for use in the session. The account can include a profile having one or more policies. The data processing system 102 can parse the input audio signal to identify a request and a trigger keyword corresponding to the request.

The NLP 104 can obtain the input audio signal. The NLP 104 of the data processing system 102 can receive the data packets with the voice input or input audio signal responsive to the digital assistant 124 detecting a trigger keyword. The trigger keyword can be a wakeup signal or hotword that indicates to the local computing device 110 to convert the subsequent audio input into text and transmit the text to data processing system 102 for further processing.

Upon receiving the input audio signal, the NLP 104 can identify at least one request or at least one keyword corresponding to the request. The request can indicate intent or subject matter of the input audio signal. The keyword can indicate a type of action likely to be taken. For example, the NLP 104 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request. In another example, the voice input can include a search query such as "find jobs near me."

The NLP 104 can parse the input audio signal to identify, determine, retrieve, or otherwise obtain the request and one or more keywords associated with the request. For instance, the NLP 104 can apply a semantic processing technique to the input audio signal to identify the keyword or the request. The NLP 104 can apply the semantic processing technique to the input audio signal to identify a keyword or phrase that includes one or more keywords, such as a first keyword and a second keyword. For example, the input audio signal can include the sentence "I want to purchase an audiobook." The NLP 104 can apply a semantic processing technique, or other natural language processing technique, to the data packets comprising the sentence to identify keywords or phrases "want to purchase" and "audiobook". The NLP 104 can further identify multiple keywords, such as purchase, and audiobook. For example, the NLP 104 can determine that the phrase includes a first and second keyword.

The NLP 104 can filter the input audio signal to identify the trigger keyword. For example, the data packets carrying the input audio signal can include "It would be great if I could get someone that could help me go to the airport", in which case the NLP 104 can filter out one or more terms as follows: "it", "would", "be", "great", "if", "I", "could", "get", "someone", "that", "could", or "help". By filtering out these terms, the NLP 104 may more accurately and reliably identify the trigger keywords, such as "go to the airport" and determine that this is a request for a taxi or a ride sharing service.

In some cases, the NLP 104 can determine that the data packets carrying the input audio signal includes one or more requests. For example, the input audio signal can include the sentence "I want to purchase an audiobook and monthly subscription to movies." The NLP 104 can determine this is a request for an audio book and a streaming multimedia service. The NLP 104 can determine this is a single request or multiple requests. The NLP 104 can determine that this is two requests: a first request for a service provider that provides audiobooks, and a second request for a service provider that provides movie streaming. In some cases, the NLP 104 can combine the multiple determined requests into a single request, and transmit the single request to a service provider device 140. In some cases, the NLP 104 can transmit the individual requests to another service provider device, or separately transmit both requests to the same service provider device 140.

The digital assistant 124 can transmit a request for content to the content selector 108. The digital assistant 124 can transmit a request for supplementary or sponsored content from a third-party content provider. The digital assistant 124 can transmit the request responsive to detecting an action or invoking a deep link. The content selector 108 can perform a content selection process to select a supplementary content item or sponsored content item based on the action in the voice query. The content item can be a sponsored or supplementary digital component object. The content item can be provided by a third-party content provider, such as a supplementary digital content provider device 142. The supplementary content item can include an advertisement for goods or services. The content selector 108 can use the content selection criteria to select a content item responsive to receiving a request for content from the digital assistant 124.

The digital assistant 124 can receive a supplementary or sponsored content item from the content selector 108. The digital assistant 124 can receive the content item responsive to the request. The digital assistant 124 can receive the content item from the content selector 108, and present the content item, via audio output or visual output.

The data processing system 102 can include a content selector 108 designed, constructed, or operational to select supplementary content items (or sponsored content items or digital component objects). To select sponsored content item or digital components, the content selector 108 can use the generated content selection criteria to select a matching sponsored content item based on a broad match, exact match, or phrase match. For example, the content selector 108 can analyze, parse, or otherwise process subject matter of candidate sponsored content items to determine whether the subject matter of the candidate sponsored content items correspond to the subject matter of the keywords or phrases of the content selection criteria (e.g., an action or intent). The content selector 108 can identify, analyze, or recognize voice, audio, terms, characters, text, symbols, or images of the candidate digital components using an image processing technique, character recognition technique, natural language processing technique, or database lookup. The candidate sponsored content items can include metadata indicative of the subject matter of the candidate digital components, in which case the content selector 108 may process the metadata to determine whether the subject matter of the candidate digital component corresponds to the input audio signal. The content campaign provided by the supplementary digital content provider device 142 can include content selection criteria that the data processing system 102 can match to criteria indicated in the second profile layer or the first profile layer.

Supplementary digital content providers may provide additional indicators when setting up a content campaign that includes digital components. The supplementary digital content provider device 142 may provide information at the content campaign or content group level that the content selector 108 may identify by performing a lookup using information about the candidate digital component. For example, the candidate digital component may include a unique identifier, which may map to a content group, content campaign, or content provider.

Responsive to the request, content selector 108 can select a digital component object associated with the supplementary digital content provider device 142. The supplementary digital content can be provided by a supplementary digital content provider device different from the service provider device 140. The supplementary digital content can correspond to a type of service different from a type of service of the action data structure (e.g., taxi service versus food delivery service). The computing device 110 can interact with the supplementary digital content. The computing device 110 can receive an audio response to the digital component. The computing device 110 can receive an indication to select a hyperlink or other button associated with the digital component object that causes or allows the computing device 110 to identify the supplementary digital content provider device 142 or service provider device 140, request a service from the supplementary digital content provider device 142 or service provider device 140, instruct the supplementary digital content provider device 142 or service provider device 140 to perform a service, transmit information to the supplementary digital content provider device 142 or service provider device 140, or otherwise query the supplementary digital content provider device 142 or service provider device 140.

A supplementary digital content provider device 142 can establish an electronic content campaign. An electronic content campaign can refer to one or more content groups that correspond to a common theme. A content campaign can include a hierarchical data structure that includes content groups, digital component data objects, and content selection criteria provided by the content provider. Content selection criteria provided by the content provider device 142 an include a type of content, such as a digital assistant content type, search content type, streaming video content type, streamlining audio content type, or a contextual content type. To create a content campaign, supplementary digital content provider device 142 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or supplementary digital content provider device 142), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 110. In some cases, an impression can refer to a viewable or audible impression; e.g., the digital component object is at least partially (e.g., 20%, 30%, 30%, 40%, 50%, 60%, 70%, or more) viewable on a display device 122 of the client computing device 110, or audible via a speaker (e.g., transducer 112) of the computing device 110. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The supplementary digital content provider device 142 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the supplementary digital content provider device 142 can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The supplementary digital content provider device 142 can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The supplementary digital content provider device 142 can provide one or more keywords to be used by the data processing system 102 to select a digital component object provided by the supplementary digital content provider device 142. The supplementary digital content provider device 142 can identify one or more keywords to bid on, and further provide bid amounts for various keywords. The supplementary digital content provider device 142 can provide additional content selection criteria to be used by the data processing system 102 to select digital component objects. Multiple supplementary digital content provider devices 142 can bid on the same or different keywords, and the data processing system 102 can run a content selection process or ad auction responsive to receiving an indication of a keyword of an electronic message.

The supplementary digital content provider device 142 can provide one or more digital component objects for selection by the data processing system 102. The data processing system 102 (e.g., via content selector 108) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, digital component link, or an assistant application component. A digital component object (or digital component, supplementary content item, or sponsored content item) can include, for example, a content item, an online document, audio, images, video, multimedia content, sponsored content, or an assistant application. Upon selecting a digital component, the data processing system 102 can transmit the digital component object for rendering on a computing device 110 or display device 122 of the computing device 110. Rendering can include displaying the digital component on a display device, executing an application such as a chatbot or conversational bot, or playing the digital component via a speaker of the computing device 110. The data processing system 102 can provide instructions to a computing device 110 to render the digital component object. The data processing system 102 can instruct the computing device 110, or an audio driver 116 of the computing device 110, to generate audio signals or acoustic waves.

The content selector 108 can, responsive to a request, perform a real-time content selection process. Real-time content selection can refer to or include performing the content selection responsive to a request. Real-time can refer to or include selecting the content within 0.2 seconds, 0.3 seconds, 0.4 seconds, 0.5, 0.6 seconds, or 1 second of receiving the request. Real-time can refer to selecting the content responsive to receiving the input audio signal from the computing device 110.

The content selector 108 can identify multiple candidate supplementary content items. The content selector 108 can determine a score or rank for each of the multiple candidate supplementary content items in order to select a highest ranking supplementary content item to provide to the computing device 110.

The computing device 110 can include, interface, or otherwise communicate with at least one transducer 112. The computing device 110 can include, interface, or otherwise communicate with at least one sensor 114. The computing device 110 can include, interface, or otherwise communicate with at least one audio driver 116. The computing device 110 can include, interface, or otherwise communicate with at least one indexer 118. The computing device 110 can include, interface, or otherwise communicate with at least one application programming interface ("API") 118. The computing device 110 can include, interface, or otherwise communicate with at least one application 120. The computing device 110 can include, interface, or otherwise communicate with at least one display device 122. The computing device 110 can include, interface, or otherwise communicate with at least one digital assistant 124. The digital assistant 124 can include at least one natural language processor ("NLP") 126. The digital assistant 124 can include at least one deep link selector 128. The digital assistant can include at least one action predictor 130. One or more components of the device computing device 110 can each include at least one processing unit or other logic device such as programmable logic array engine, component or module. One or more components of the device 110, such as the indexer 118, digital assistant 124, NLP 126, deep link selector 128, or action predictor 130 can be separate components or a single component. The system 100 and its components can include hardware elements, such as one or more processors, logic devices, or circuits.

The local computing device 110 can include a display device 122, such as a light indicator, light emitting diode ("LED"), organic light emitting diode ("OLED"), or other visual indicator configured to provide a visual or optic output. The sensor 114 can include, for example, an ambient light sensor, proximity sensor, temperature sensor, accelerometer, gyroscope, motion detector, GPS sensor, location sensor, microphone, or touch sensor. The transducer 112 can include a speaker or a microphone. The audio driver 116 can provide a software interface to the hardware transducer 112. The audio driver can execute the audio file or other instructions provided by the data processing system 102 to control the transducer 112 to generate a corresponding acoustic wave or sound wave.

The sensor 114 can receive or detect an input audio signal (e.g., voice input). The digital assistant 124 can be coupled to the audio driver, the transducer, and the sensor. The digital assistant 124 can filter the input audio signal to create a filtered input audio signal (e.g., by removing certain frequencies or suppressing noise). The digital assistant 124 can convert the filtered input audio signal to data packets (e.g., using a software or hardware digital-to-analog converter). In some cases, the digital assistant 124 can convert the unfiltered input audio signal to data packets and transmit the data packets to the data processing system 102. The digital assistant 124 can transmit the data packets to a data processing system 102 comprising one or more processors and memory that execute a natural language processor component.

The data repository 132 can include one or more local or distributed databases, and can include a database management system. The data repository 132 can include computer data storage or memory and can store one or more of an index 134, usage data 136, or a model 138. The index 134 can refer to or include one or more rows of data that include a deep link for an application 120 to perform a task or action. A deep link can refer to or include a uniform resource location, reference, pointer, location, or other indication of a service or resource in the application 120 or provided by the application 120. The usage data 136 can include information about prior executions of the one or more applications 120. Usage data can indicate when the application 120 was launched (e.g., a date and time stamp), the duration of use, or what action the application 120 was launched to perform. The model 138 can refer to or include a machine learning model trained using a machine learning technique. The model 138 can include predictive information. The model 138 can predict an action to perform based on an input trigger condition, such as a time stamp or geographic location.

The computing device 110 can include one or more applications 120. The one or more applications 120 can be installed on the computing device 110. The applications 120 can be downloaded from an online application marketplace, such as an online marketplace provided by the data processing system 102. The application 120 can include a native application installed on an operating system of the computing device 110 by a manufacturer of the computing device 110. The application 120 can include any type of application that can provide a resource or service. For example, the application 120 can be an exercise routine application, food ordering application, ride hailing application, weather application, document processing application, navigation application, messaging application, telephone application, streaming media application, social network application, calendar application, camera application, ticket purchasing application, electronic commerce application, banking application, financial services application, etc.

The computing device 110 can include an indexer 118 designed, constructed and operational to generate, manage, maintain, update or otherwise provide an index 134. The indexer 118 can receive information from one or more applications 120 installed on the computing device 110. The indexer 118 can receive information declared by the one or more applications 120. The application 120 can declare information responsive to being installed on the computing device 110. The application 120 can declare information responsive to being invoked, launched or executed on the computing device 110. The application 120 can declare information responsive to performing a particular task or action. In some cases, the application 120 can declare information responsive to a request from the indexer 118.

The indexer 118 can receive information declared from the application 120 via an API 144. The API 144 can be configured to receive particular type of information from the application 120, and provide the information to the indexer 118 for indexing. The API 144 can be built into the application 120. The API 144 can be built into the indexer 118. The application 120 can be configured to communicate with the indexer 118 via the API 144. The API 144 can refer to a software development kit ("SDK") provided by the data processing system 102 to a developer of the application 120 for inclusion in the application 120.

For example, the API 144 can be installed or be part of the application 120. The API 144 (or application 120) can identify a capability of the application 120. A capability can refer to an action or intent that can be performed by the application 120. A capability can be to order a coffee, order a ride via a ride sharing service, check the weather, make a phone call, send a text message, etc. The API 144, or application 120, can further identify a deep link for the application 120 that can cause the application 120 to execute the action. For example, the deep link can include a uniform resource locator, reference, identifier, pointer, script, or other code that can cause the application 120 to perform the action responsive to invocation. For example, invocation of the deep link can cause the application 120 to launch and make a phone call to a particular contact. In another example, invocation of the deep link can cause the application 120 to launch and order a coffee from a particular coffee shop.

The application 120, using the SDK or API 144, can provide actions and deep links that are personalized for a device. For example, the deep link for a "latte with 2% milk at Coffee Shop A on El Camino"). The application 120 can rank deep links for actions for the same application.

The indexer 118 can receive, from the application 120, an indication of an action and a deep link corresponding to the action declared by the application via the API 144. The indexer 118 can access an index 134 stored in the data repository 132 (e.g., memory of the device 110). The indexer 118 can input the action and the deep link into a location in the index 134. The location can refer to a row in an index, as illustrated in Table 1 below.

TABLE 1

Example Index

| Action | Deep Link | Parameter |
|---|---|---|
| Text Message | application_1://send_SMS | Contact_ID_1 |
| Order Beverage | application_2://order_coffee | Size, milk quantity, sugar quantity |

Table 1 illustrates an example index 134 that can be generated, maintained or updated by the indexer 118, and used by the deep link selector 128 to invoke a deep link. The deep link can refer to a hyperlink or a uniform resource identifier ("URI") that links to a specific digital resource or content, or service in an application 120. The deep link can link to a specific digital resource or service, as opposed to a main screen or page of the application 120, or just launching the application 120. Deep linking for an application 120 can include using a URI that links to a specific location within the application 120, rather than just launching the application.

The indexer 118 can store the deep link and action in the index 134. The index 134 can be configured to be only accessible to the indexer 118, digital assistant 124, and applications 120 that are authorized by the developer of the application 120 that declared the deep link. The indexer 118 can store the deep link at the location in the index 134 with a cryptographic token. The cryptographic token can be designed to allow the target application 120 to verify that the deep link intent came from the shortcut in the index and was not constructed arbitrarily by another application 120. For example, the cryptographic can allow the target application 120 to verify that the deep link is genuine.

In some cases, the actions stored in the index 134 can be available to all applications 120 to execute, or can be private to specific applications 120. The cryptographic token can allow the application 120 to publish shortcuts that are backed by a "public" action, but refuse to execute the action unless the action or deep link has the token. Since only the digital assistant 120 or the indexer 118 can access the action and deep link (or other metadata, such as the token), this can limit the ability to invoke shortcuts to the indexer 118 or the digital assistant 124.

For example, a first application 120 can publish the following deep link: "app://orderFood?food-burger&token=abcd". The application 120 can expose the URL scheme that would potentially allow any other application 120 to call "app://orderFood?food=pizza". However, since the first application 120 verifies the token, only systems or components of the computing device 110 that possess the token can use this URL scheme. Thus, the cryptographic token can ensure that only authorized applications or components can access or invoke the deep link.

The index 134 can be accessible to multiple applications 120 that are executable by the device 110. For example, the index 134 can include multiple rows of deep links and corresponding actions. The deep links can be to various applications 120. Thus, the various applications 120 can declare information that the indexer 118 can store in the index 134. The index 134 can be used to invoke deep links for different applications 120. When the deep link is invoked, the application 120 that provided the deep link can be launched to perform the action. The application 120, when launched via the deep link, can receive information about the deep link or action or other parameters associated with the deep link. In some cases, the application 120 may be granted access to the deep link stored in the index. In some cases, the application 120 may be able to parse the deep link in order to execute the deep link. The application 120 can access a deep link in the index 134 that is provided by the application 120 to invoke the deep link to perform a corresponding action.

To ensure that the application that invokes the deep link or action is authorized to do so and access the index (or otherwise prevent unauthorized applications 120 from accessing a deep link stored in the index 134), the indexer 118 can wrap the deep link with a cryptographic token. For example, an application 120 that obtains the deep links through some other means, but does not have access to the token, cannot invoke the deep link if they do not have access to the index. A cryptographic token can represent a programmable access rights that are accessible only by the application 120 that has the private key for that address or location in the index, and can only be signed using the private key. The indexer 118 can have access to the private key for the application 120 in order to wrap the deep link in the index 134. The indexer 118 can provide the private key for the application to the digital assistant 124 to allow the digital assistant 124 to access the index 134 to invoke a deep link. However, the indexer 118 may not provide the private key to a different application 120 that did not provide the deep link. For example, a first application 120 can declare the action and corresponding deep link. The indexer 118 can wrap the deep link with a cryptographic token that can be accessed by a first private key. The first application 120 can have access to the private key. However, a second application 120 downloaded and installed on the device 110 may not have access to the private key and, therefore, be prevented or precluded from accessing the deep link provided by the first application 120 because the indexer 118 wrapped the deep link with the cryptographic token. Thus, the indexer 118 can generate a secure index 134 that is configured to prevent unauthorized applications 120 from invoking deep links, thereby preventing or reducing undesired activity, malicious action execution, wasted computing resource utilization, or wasted network bandwidth utilization.

The indexer 118 can intercept request to invoke a deep link in the index 134, and confirm that the invoker of the deep link (e.g., the digital assistant 124) is authorized to access the particular deep link before granting access.

The indexer 118 can encrypt the deep link using a security or encryption technique. For example, the indexer 118 can use a cryptographic key to lock the location of the index 134 or the deep link, and provide the cryptographic key to the application 120 that declares the deep link. The cryptographic key can be a long term key, such as a static or archived key. The cryptographic key can last for a duration of time, such as 1 day, 2 days, 3 days, 7 days, 30 days, 60 days, 90 days, 1 year, or more, thereby allowing the digital assistant 124 to invoke the deep link stored in the index 134 without the indexer 118 having to continuously update or regenerate the index 134.

The indexer 118 can receive multiple actions corresponding to multiple deep links declared by one or more applications 120. The one or more applications 120 can declare the deep links responsive to installation of the application 120, or dynamically declare the deep links responsive to the application 120 performing an action. For example, the indexer 118 can receive the action and the corresponding deep link declared by the application 120 responsive to a prior execution of the action by the application 120, such as when the user of the device 110 launches the application 120 to perform an action. The indexer 118 can store deep links from different applications 120 with different cryptographic tokens or cryptographic keys. The indexer 118 can store different deep links in different location or different rows in the index 134. By storing the deep link with a different cryptographic token or key, the indexer 118 can prevent an application without the cryptographic key from access the deep link at the location in the index.

The computing device 110 can include a digital assistant 124 designed, constructed and operational to receive a voice query or other audio input detected by a sensor 114 of the device 110, determine an intent or action based on the voice input, and invoke a deep link to execute the action. The digital assistant 124 can include an NLP 126. The NLP 126 can include one or more component or functionality of the NLP 104 of the data processing system 102. For example, the NLP 126 of the computing device 110 can be referred to as a local NLP 126, and the NLP 104 of the data processing system 102 can be referred to as a server NLP 104. The local NLP 126 can interface with or communicate with the server NLP 104 to parse or process a voice input or audio input. In some cases, the local NLP 126 can be configured to process or parse the voice input without interfacing or communicating with the server NLP 104. For example, the computing device 110 can perform digital assistant functionality without communicating via network 105 with the data processing system 102. The computing device 110 can receive a voice query, parse the voice query, identify an action, and invoke an application 120 to execute the corresponding deep link without communicating via network 105 with the data processing system 102.

For example, the local NLP 126 can receive the voice query or voice input from the sensor 114 or transducer 112, or other microphone of the device 110. The local NLP 126 can detect a keyword in the voice query. In some cases, the NLP 126 can detect a trigger keyword, hotword, wake word, or other keyword that indicates to that the digital assistant 124 is to perform an action responsive to the voice query. In some cases, the local NLP 126 can transmit the voice query to the server NLP 104 responsive to detection of the trigger keyword to allow the server NLP 104 to process the voice query and determine an action, intent, or other perform other semantic understanding on the voice query. In some cases, the local NLP 126 can be configured to perform the semantic understanding on the voice query to identify an intent or action in the voice query.

The local NLP 126 (or the local NLP 126 via the server NLP 104) can identify an action or intent in the voice query using semantic processing or other semantic understanding. The local NLP 126 can identify an action or intent in the voice query, such as to order a coffee from a coffee shop. The digital assistant 124 can include, interface with, or otherwise access a deep link selector 128 designed, constructed and operational to select a deep link based on the action or intent in the voice query identified by the local NLP 126.

The deep link selector 128 can identify multiple deep links associated with the action. For example, multiple applications 120 may have declared deep links for the same action. The computing device 110 can include multiple applications 120 that are configured to perform the same action, and each of those multiple application 120 can declare deep links for the action. For example, the computing device 110 can have installed two different ride hailing applications 120 that can order a ride to take the user from a first destination to a second destination. The deep link selector 128 can use one or more techniques to select a particular deep link for a particular application 120 to invoke responsive to the action in the voice query.

For example, the voice query can indicate the application 120 to use to perform the action. If the voice query includes an indication of the application 120 (e.g., a name of the application or other identifier of the application 120), then the deep link selector 128 can select the deep link in the index 134 that corresponds to the identified application 120. The voice query can include an indication or identifier of the application 120 to use to perform the action. The digital assistant 124 can parse the voice query using natural language processing to identify an indication of the application in the voice query. The deep link selector 128 can perform a lookup in the index 134 to identify one or more deep links declared by the application 120 identified in the voice query. The deep link selector 128 can perform a lookup to identify the deep link corresponding to the action declared by the application 120. The deep link selector 128 can then invoke the deep link for the application 120 to perform the action in the voice query.

If, however, the voice query does not include an indication of the application 120, then the deep link selector 128 can determine whether the voice query includes a parameter for the action. The parameter can refer to a particular value, input, or other instructions that can be used by the application 120 to execute the deep link. However, not all applications that can perform the action with the parameter. For example, the action can include calling a particular contact identifier. A first application 120 may not have access to the contact information for the particular contact identifier, whereas a second application 120 may have access to the contact information for the particular contact identifier. The index 134 can store the deep link along with the available parameters. The deep link selector 128 can perform a lookup in the index 134 for the action, as well as the parameter to identify candidate deep links that are configured to perform the action using the parameter. Thus, the deep link selector 128 can select the deep link declared by the application 120 to perform the action based on the application 120 being configured to execute the action with the parameter in the voice query.

The deep link selector 128 can identify multiple candidate deep links responsive to the lookup with the action identified in the voice query. The deep link selector 128 can rank the candidate deep links, or applications 120 to which the deep links correspond, using usage data 136. Usage data 136 can indicate a date or time stamp for each of the applications 120 associated with the candidate deep links. The deep link selector 128 can rank the application 120 based on how recent the application 120 was executed on the computing device 110, and select the application 120 that was most recently executed on the device 110 that is associated with a candidate deep link.

For example, the deep link selector 128 can perform a lookup with the action in the index 134 to identify the deep link declared by a first application 120 and a second deep link declared by a second application 120 that is responsive to the action. The deep link selector 128 can select, based on historical execution of the application and the second application on the device, the deep link declared by the application to perform the action. The historical execution can refer to the deep link selector selecting the application that was most recently executed on the computing device 110, or the application that was executed the most during a time window (or all time) on the computing device 110.

The deep link selector 128 can determine, from the usage data, the frequency of execution of each application 120 over a time interval. For example, the deep link selector 128 can determine the number of times the application 120 was executed or launched on the computing device 110 over the past 24 hours, 48 hours, 72 hours, 7 days, 30 days, 60 days, 90 days, or other time interval. In another example, the deep link selector 128 can determine which application was executed with the highest frequency on a particular day of the week (e.g., weekday versus weekend), or during a time of day (e.g., between 9 and 12 AM, 12-6 PM, or between 6 PM and 9 AM). The deep link selector 128 can rank the applications 120 associated with the candidate deep links based on the frequency of execution during the time interval, such that the highest ranking application 120 corresponds to the highest frequency of execution. The deep link selector 128 can select the candidate deep link for the application 120 that has the highest frequency of execution.

Upon selecting the deep link for the application 120, the deep link selector 128 can invoke the deep link to execute the action. Invoking the deep link can include launching the application 120 and performing the application. The digital assistant 124 can have access to the cryptographic token used by the indexer 118 to securely store the deep link in the index 134. The digital assistant 124 can use the cryptographic token or cryptographic key for the deep link and application 120 to access the deep link and invoke the deep link to cause the application 120 executed by the device to perform the action.

The digital assistant 124 can proactively identify an action to perform. The digital assistant 124 can perform an action or suggest an action independent of receiving a voice query from a user of the computing device 110. The computing device 110 can suggest a deep link for an application 120 to a user of the computing device 110 without the user inputting a voice query. For example, the digital assistant 124 can include an action predictor 130 designed, constructed and operational to identify a trigger condition or a trigger event. The trigger condition be based on one more trigger parameters such as a time stamp, time interval, geographic location, transportation (e.g., driving, walking, running, biking, train, bus), etc. The action predictor 130 can identify one or more trigger conditions based on the trigger parameters. The action predictor 130 can determine a trigger condition based on a trigger parameter. For example, the action predictor 130 can determine that at 9 AM, a user historically orders a coffee from a coffee shop with the computing device 110 is located at a work location. The action predictor 130 can determine that the current time is 9 AM (e.g., a first trigger parameter), and the geographic location corresponds to a work location (e.g., a second trigger parameter). The action predictor 130 can input the first trigger parameter and the second trigger parameter into a model 138 to predict an action (e.g., order a coffee).

The model 138 can be trained using a machine learning technique, such as a statistical technique, regression technique, neural network, or other machine learning technique. The training data can include historical parameters associated with actions performed on the computing device 110. For example, the digital assistant 124 can use data or parameters associated with actions performed by applications 120 to train the model 138 to predict actions based on trigger parameter. The data can include time stamps or locations or other information associated with historical execution of the application to perform an action. Upon training the model 138, the action predictor 130 can input one or more trigger parameters into the model 138 to predict an action to perform. The model 138 can be trained to predict actions based on the historical behavior or habit of the user.

Upon predicting the action, the action predictor 130 can provide the action to the deep link selector 128. The deep link selector 128 can receive the predicted action and perform a look up in the index 134 to identify one or more deep links declared by applications 120 that are responsive to the action. The deep link selector 128 can select a highest ranking deep link. The deep link selector can present the deep link or application 120 as a suggestion via a display device 122 or audio output. The digital assistant 124 can provide a visual prompt, or audio prompt (e.g., audio query) requesting invocation of the deep link. The digital assistant 124 can receive a selection or indication to invoke the corresponding deep link, and then launch the application 120 to perform the action via the deep link.

Figure 2:
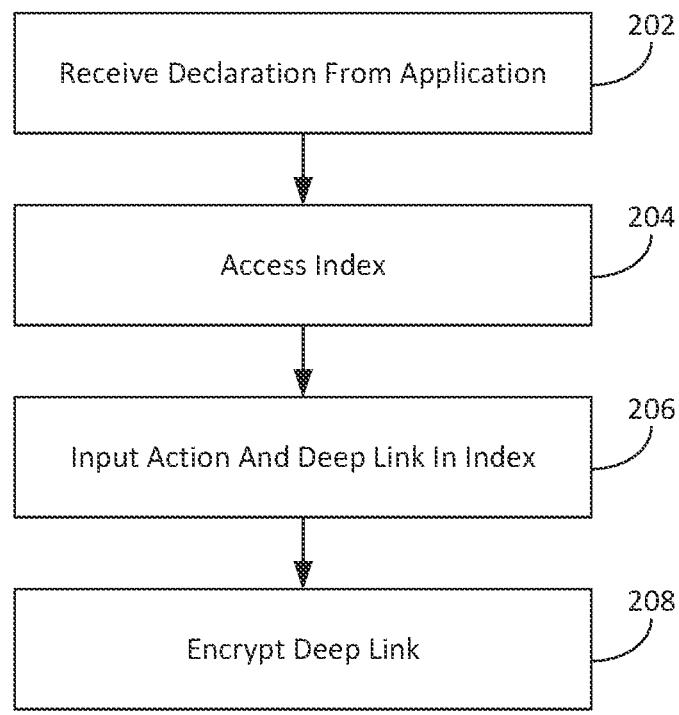
FIG. 2 is an illustration of an example method of generating an index with application actions for voice-based execution, in accordance with implementations.

FIG. 2 is an illustration of an example method of generating an index with application actions for voice-based execution, in accordance with implementations. The method 200 can be performed by one or more system or component depicted in FIG. 1, including, for example, a computing device, indexer, digital assistant, or data processing system. At ACT 202, an indexer executing on a computing device having one or more processors can receive a declaration from an application. The indexer can receive the declaration via an application programming interface. The declaration can include an indication of a capability of the application, along with a deep link used to invoke, execute, perform, or otherwise provide the capability. The declaration can be provided by the application to the indexer responsive to the application being installed, or responsive to execution of the action or performance of the capability by the application. In some cases, the declaration can be provided responsive to an instruction or request to provide the declaration. The indexer can receive one or more declarations from one or more applications and one or more actions.

At ACT 204, the indexer can access an index stored in memory or other storage or memory of the computing device. The index can be stored locally on the device. The index may not be uploaded or otherwise provided to a data processing system or server. The index can include one or more rows. The index may be accessible to multiple applications on the computing device. However, not all applications on the device may be granted access to all of the contents of the index. For example, a first application may be able to access a first one or more rows in the index containing a first one or more deep links declared by the first application. The first application can be prevented or blocked or otherwise unable to access a second one or more rows containing deep links declared by a second application that is different from the first application. For example, the indexer can encrypt or otherwise secure the rows such that only the application that declared the deep link, or that is otherwise authorized to access the deep link (e.g., the digital assistant) can access the deep link.

At ACT 206, the indexer can input the deep link in the index. The indexer can store the action along with the deep link in a row of the index. The indexer can store one or more parameters associated with the deep link. The indexer can store an indication of the application that declared the deep link, such as the name of the application or other unique identifier of the application that declared the deep link.

At ACT 208, the indexer can encrypt the deep link. The indexer can encrypt the deep link using a cryptographic token or other encryption technique. The indexer can wrap the action or deep link with a cryptographic key or token that can prevent unauthorized applications from invoking or accessing the deep link.

Figure 3:
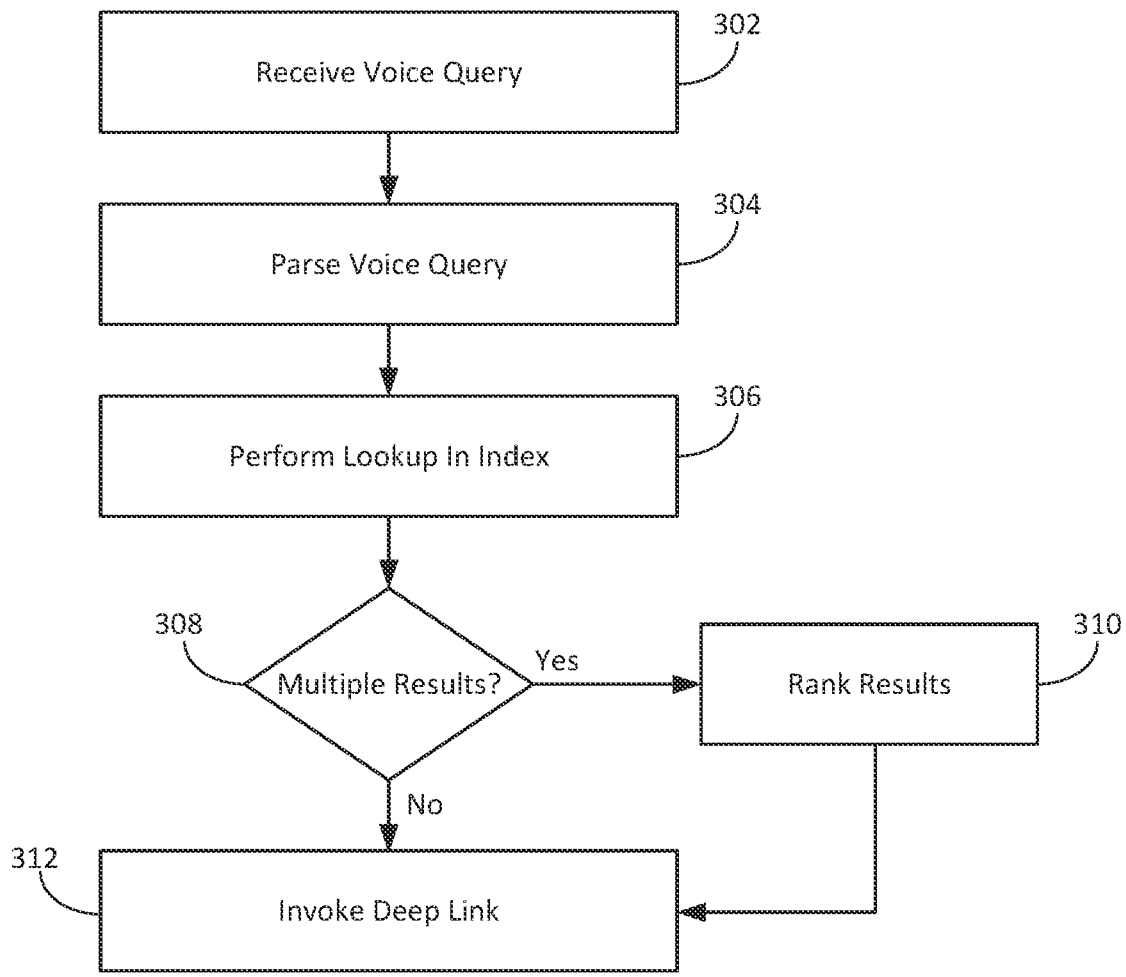
FIG. 3 is an illustration of an example method of voice-based execution of an action using an index, in accordance with implementations.

FIG. 3 is an illustration of an example method of voice-based execution of an action using an index, in accordance with implementations. The method 300 can be performed by one or more system or component depicted in FIG. 1, including, for example, a computing device, indexer, digital assistant, or data processing system. At ACT 302, the method 300 can include receiving voice input. The voice input can include a voice input query provided by a user or other speaker, and detected by a microphone of a computing device, such as a smartphone or tablet computing device, for example. The voice query can include a request, instruction, or command to perform an action. The voice query can include an intent. The voice query can include a command to order a coffee, ride, purchase goods, or other instructions or command.

At ACT 304, the digital assistant can parse the voice query. The digital assistant executing on the computing device can parse the voice query using natural language processing to determine an intent or action associated with the voice query. The digital assistant can perform semantic understanding to identify the intent or action in the voice query. In some cases, the digital assistant can interface with a server digital assistant or data processing system to determine the intent or action. The server digital assistant or data processing system can include a more powerful natural language processor that can more accurately, reliably, or quickly parse the voice query to determine the intent or action. The local digital assistant can transmit data packets corresponding to the audio input to the server digital assistant for natural language processing. The server digital assistant can transmit the determine intent or action back to the local digital assistant for further processing.

At ACT 306, the local digital assistant on the computing device that detected the audio input can receive the action in the voice query, and perform a lookup in an index stored locally on the computing device. The digital assistant can identify one or more deep links in the index responsive to the lookup.

At decision block 308, the digital assistant can determine whether the lookup resulted multiple deep links. For example, there can be multiple applications that declared deep links for the same action provided in the voice query. If the digital assistant identify multiple results, the digital assistant can proceed to ACT 310 to rank the results. At ACT 310, the digital assistant can rank the results using a ranking technique to select a highest ranking deep link or application. The ranking technique can be based on recency or frequency of usage. The digital assistant can select the deep link for the application that was most recently executed on the computing device. The digital assistant can select the deep link for the application that was executed the most on the computing device to date, or in a previous time interval (e.g., past 24 hours, 48 hours, 7 days, 30 days, or during a corresponding time window).

Upon selecting the highest ranking application at ACT 310, or if there was only one result identified responsive to the lookup at ACT 306, the digital assistant can proceed to ACT 312 to invoke the deep link. The digital assistant can use the cryptographic token or key used to encrypt the deep link in the index to access the deep link. The digital assistant can decrypt the deep link or otherwise access the deep link to invoke the deep link. The digital assistant can invoke the deep link to cause the application to execute the action.

Figure 4:
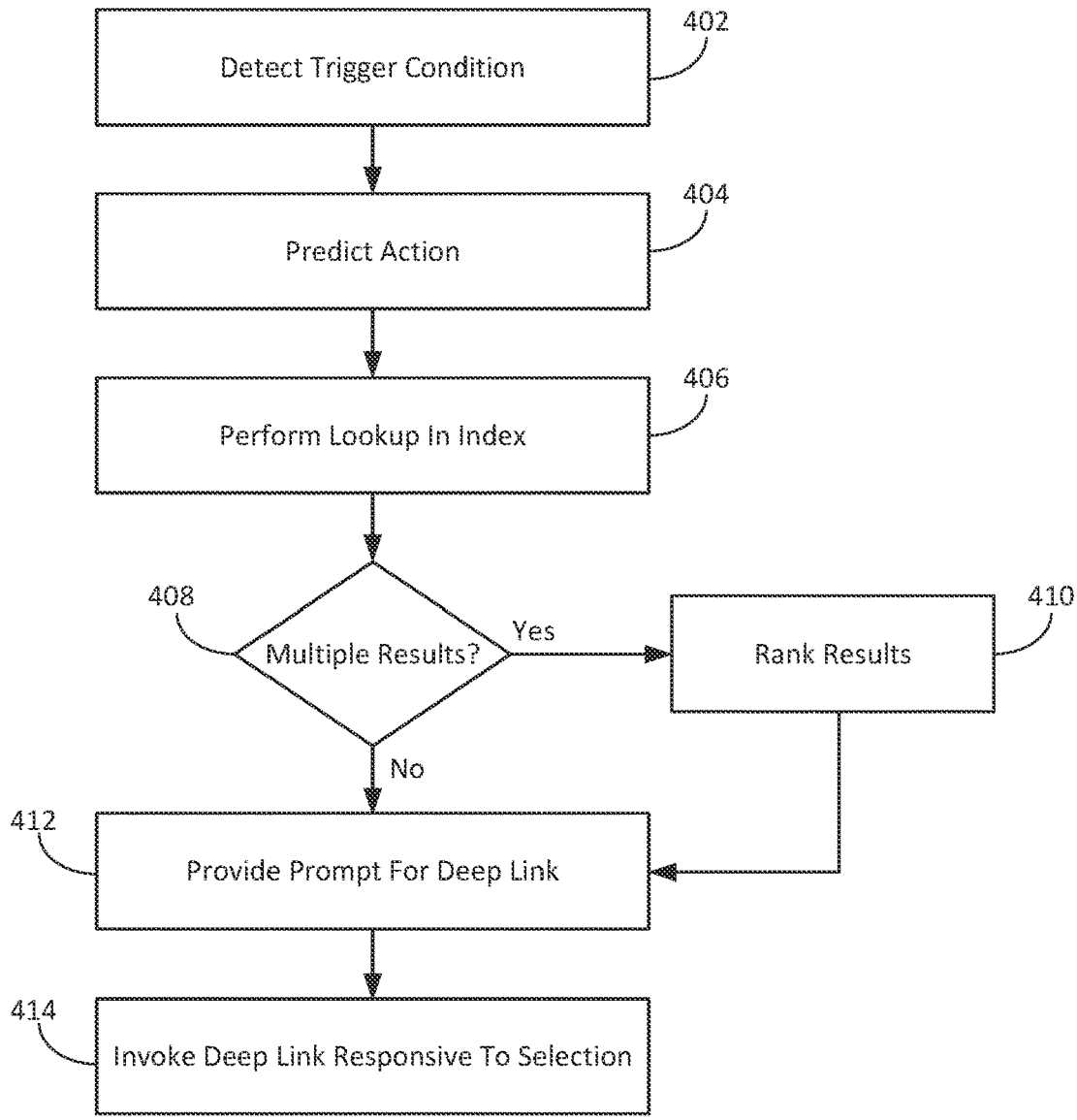
FIG. 4 is an illustration of an example method of predicting an action using an index of application actions, in accordance with implementations.

FIG. 4 is an illustration of an example method of predicting an action using an index of application actions, in accordance with implementations. The method 400 can be performed by one or more system or component depicted in FIG. 1, including, for example, a computing device, indexer, digital assistant, or data processing system. At ACT 402, the digital assistant can detect a trigger condition. A trigger condition can correspond to one or more trigger parameters, such as a time, location, or mode of transportation. The trigger parameters can be used to detect a trigger condition. For example, trigger parameters for 9 AM at a work location can be a trigger condition to cause the digital assistant to predict an action. The trigger parameters can be associated with a user context.

At ACT 404, the digital assistant can input the trigger parameters into a model to predict an action. The model can be trained using a machine learning technique and historical training data. The training data can be collected based on historical execution of applications on the computing device. The training data can be generated for a particular computing device or account thereof. The digital assistant can input the trigger parameters into the model to output an action. The action can refer to an action that a user of the computing device is likely to want to execute based on the current trigger parameters.

At ACT 406, the digital assistant can perform a lookup in an index with the action to identify one or more deep links. If the digital assistant does not identify any deep links (e.g., the lookup returns a null set), the digital assistant can terminate the method 400 and not suggest any action. If, however, the digital assistant identifies one or more deep links responsive to the lookup, the digital assistant can proceed to decision block 408.

At decision block 408, the digital assistant can determine whether there are multiple deep links responsive to the lookup with the action. If there are multiple results (e.g., two or more results), then the digital assistant can proceed to ACT 410 to rank the results (e.g., similar to ACT 310).

The digital assistant can proceed to ACT 412 upon selecting the highest ranking deep link from ACT 410, or proceed directly to ACT 412 from decision block 408 if there was a single result responsive to the lookup performed at ACT 406. AT ACT 412, the digital assistant can provide or otherwise present the deep link with a prompt. The prompt can include a request to select or invoke the deep link. The prompt can be a visual or auditory prompt. The user can respond to the prompt via a selection (e.g., touch interface, gesture, keyboard, mouse) or audio input (e.g., voice input or voice instruction). At ACT 414, the digital assistant can invoke the deep link responsive to the selection to cause the application to execute the corresponding action.

Figure 5:
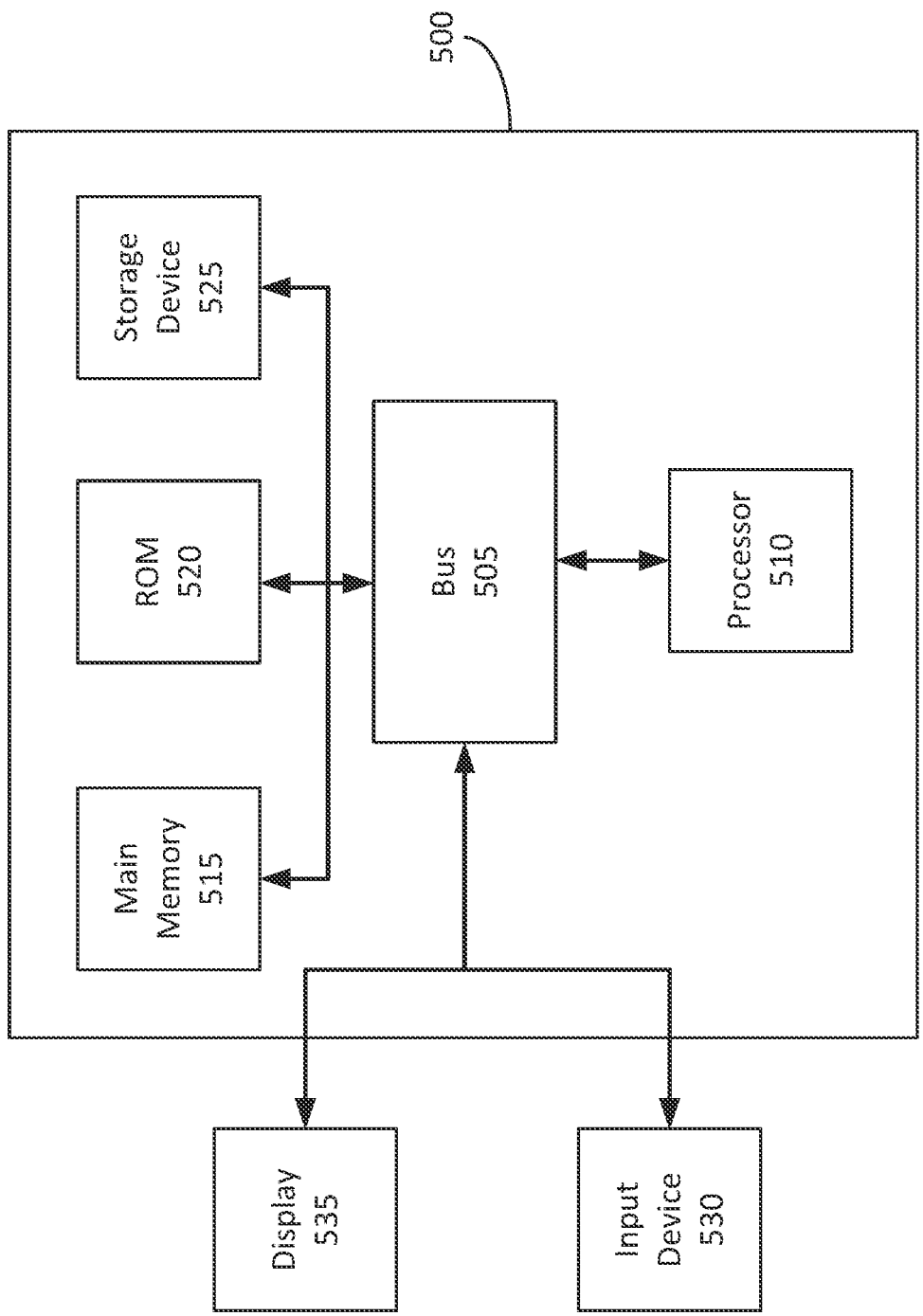
FIG. 5 is a block diagram illustrating a general architecture for a computer system that can be employed to implement elements of the systems and methods described and illustrated herein, including, for example, the system depicted in FIG. 1, and the methods depicted in FIGS. 3, 4 and 5.

FIG. 5 is a block diagram of an example computer system 500. The computer system or computing device 500 can include or be used to implement the system 100, or its components such as the data processing system 102, or computing device 110. The data processing system 102 or computing device 110 can include an intelligent personal assistant or voice-based digital assistant. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 132. The main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repository 132.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 102, the client computing device 110 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the NLP 126, deep link selector 128, and action predictor 130, or other components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the local computing device 110 or the supplementary digital content provider device 142 or the service provider device 140).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the interface 106 or the NLP 104, can be a single component, app, or program, or a logic device having one or more processing circuits, or part of one or more servers of the data processing system 102.

Having now described some illustrative implementations, it is apparent that the foregoing is illustrative and not limiting, having been provided by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system configured to index application actions for voice-based execution, comprising:
a device comprising one or more processors and memory;
an indexer executed by the device to:
receive a plurality of actions and a corresponding plurality of deep links declared by an application responsive to installation of the application on the device;
receive, from the application executed by the device, an indication of an action and a deep link corresponding to the action declared by the application via an application programming interface;
access an index stored in the memory of the device that is accessible to a plurality of applications executable by the device; and
input, into a location in the index, the action and the deep link with a cryptographic token that prevents access to the location in the index by unauthorized applications of the plurality of applications; and
a digital assistant executed by the device to:
receive a voice query detected by a microphone of the device;
parse the voice query to determine the action;
perform a lookup in the index to identify the deep link corresponding to the action; and
invoke, with the cryptographic token, the deep link to cause the application executed by the device to perform the action.

2. The system of claim 1, wherein:
the indexer is configured to receive the action and the corresponding deep link declared by the application responsive to a prior execution of the action by the application.

3. The system of claim 1, wherein the indexer is configured to:
receive a plurality of actions and a corresponding plurality of deep links from a second application installed on the device that is different from the application;
store, with a second cryptographic token, the plurality of actions and the corresponding plurality of deep links in the index at a second one or more locations different from the location, the second cryptographic token configured to prevent access to the application to the second one or more locations in the index.

4. The system of claim 1, wherein the digital assistant is configured to:
parse the voice query using natural language processing to identify an indication of the application in the voice query;
perform a first look up in the index to identify one or more deep links declared by the application; and
perform the lookup to identify the deep link corresponding to the action declared by the application.

5. The system of claim 1, wherein the digital assistant is configured to:
perform a lookup with the action in the index to identify the deep link declared by the application and a second deep link declared by a second application of the plurality of applications that is responsive to the action; and
select, based on historical execution of the application and the second application on the device, the deep link declared by the application to perform the action.

6. The system of claim 5, wherein:
the digital assistant is configured to select the deep link declared by the application to perform the action based on the application used to execute the action on the device a greater number of times than the second application.

7. The system of claim 5, wherein:
the digital assistant is configured to select the deep link declared by the application to perform the action based on the application used to execute the action on the device more recently than the second application.

8. The system of claim 5, wherein the digital assistant is configured to:
identify a parameter in the voice query associated with the action; and
select the deep link declared by the application to perform the action based on the application being configured to execute the action with the parameter in the voice query.

9. The system of claim 1, wherein the digital assistant is configured to:
identify a parameter in the voice query; and
invoke the deep link to cause the application to perform the action with the parameter in the voice query.

10. The system of claim 1, wherein the digital assistant is configured to:
identify a trigger condition;
determine, based on a model, a second action responsive to the trigger condition;
perform a lookup in the index with the second action to identify a second deep link declared by the application; and
provide, for presentation via the device, an indication of the second action with a prompt to invoke the second deep link to cause the application to perform the second action.

11. A method of indexing application actions for voice-based execution, comprising:
receiving a plurality of actions and a corresponding plurality of deep links declared by an application responsive to installation of the application on the device;
receiving, by an indexer executed by a device comprising one or more processors and memory, from the application executed by the device, an indication of an action and a deep link corresponding to the action declared by the application via an application programming interface;
accessing, by the indexer, an index stored in the memory of the device that is accessible to a plurality of applications executable by the device;
inputting, by the indexer into a location in the index, the action and the deep link with a cryptographic token that prevents access to the location in the index by unauthorized applications of the plurality of applications;
receiving, by a digital assistant executed by the device, a voice query detected by a microphone of the device;
parsing, by the digital assistant, the voice query to determine the action;
performing, by the digital assistant, a lookup in the index to identify the deep link corresponding to the action; and
invoking, by the digital assistant, with the cryptographic token, the deep link to cause the application executed by the device to perform the action.

12. The method of claim 11, comprising:
receiving, by the indexer, the action and the corresponding deep link declared by the application responsive to a prior execution of the action by the application.

13. The method of claim 11, comprising:
receiving, by the indexer, a plurality of actions and a corresponding plurality of deep links from a second application installed on the device that is different from the application;
storing, by the indexer, with a second cryptographic token, the plurality of actions and the corresponding plurality of deep links in the index at a second one or more locations different from the location, the second cryptographic token configured to prevent access to the application to the second one or more locations in the index.

14. The method of claim 11, comprising:
parsing, by the digital assistant, the voice query using natural language processing to identify an indication of the application in the voice query;
performing, by the digital assistant, a first look up in the index to identify one or more deep links declared by the application; and
performing, by the digital assistant, the lookup to identify the deep link corresponding to the action declared by the application.

15. The method of claim 11, comprising:
performing, by the digital assistant, a lookup with the action in the index to identify the deep link declared by the application and a second deep link declared by a second application of the plurality of applications that is responsive to the action; and
selecting, by the digital assistant, based on historical execution of the application and the second application on the device, the deep link declared by the application to perform the action.

16. The method of claim 15, comprising:
selecting, by the digital assistant, the deep link declared by the application to perform the action based on the application used to execute the action on the device a greater number of times than the second application.

17. The method of claim 15, comprising:
selecting, by the digital assistant, the deep link declared by the application to perform the action based on the application used to execute the action on the device more recently than the second application.

18. The method of claim 15, comprising:
identifying, by the digital assistant, a parameter in the voice query associated with the action; and
selecting, by the digital assistant, the deep link declared by the application to perform the action based on the application being configured to execute the action with the parameter in the voice query.

* * * * *